(12) United States Patent
Lasch

(10) Patent No.: US 6,802,801 B2
(45) Date of Patent: Oct. 12, 2004

(54) TOOL CHANGING DEVICE FOR A TOOL MACHINE

(75) Inventor: Thorsten Lasch, Aspach (DE)

(73) Assignee: Deckel Maho Speech GmbH, Seebach (DE)

(*) Notice: Subject to any disclaimer, the term of this patent is extended or adjusted under 35 U.S.C. 154(b) by 0 days.

(21) Appl. No.: 09/993,154

(22) Filed: Nov. 6, 2001

(65) Prior Publication Data
US 2002/0035018 A1 Mar. 21, 2002

(30) Foreign Application Priority Data
Mar. 15, 2000 (DE) .......................... 100 12 665

(51) Int. Cl.⁷ .............................................. B23Q 3/157
(52) U.S. Cl. ............................ 483/49; 483/40; 483/41; 483/51
(58) Field of Search ............................ 483/40, 48, 49, 483/51, 38, 41, 44, 45, 46

(56) References Cited

U.S. PATENT DOCUMENTS

| 4,404,728 A | * | 9/1983 | Ishikawa | 15/316.1 |
| 4,637,120 A | * | 1/1987 | Geiger | 483/46 |
| 4,642,875 A | * | 2/1987 | Rutschle et al. | 483/40 |
| 5,624,365 A | * | 4/1997 | Haninger et al. | 483/38 |
| 6,042,524 A | * | 3/2000 | Kato | 483/13 |

FOREIGN PATENT DOCUMENTS

| DE | 3818564 | * | 12/1989 | 483/51 |
| EP | 0342257 | * | 5/1988 | 483/38 |
| EP | 0293509 | * | 12/1988 | 483/51 |
| EP | 0640433 | * | 6/1994 | 483/38 |
| JP | 60-123241 | * | 7/1985 | 483/38 |
| JP | 61-50743 | * | 3/1986 | 483/51 |
| JP | 63-134146 | * | 6/1988 | 483/38 |

* cited by examiner

Primary Examiner—William Briggs
(74) Attorney, Agent, or Firm—Bourque & Associates

(57) ABSTRACT

A tool changing device for a tool machine having a tool spindle which can be moved at least in the spindle direction and with which a tool can be engaged in a spindle hand-over position. A tool magazine/storage area houses a tool to be changed in a magazine ready position with an orientation diverging from the spindle direction. A transport device is fitted with a tool holder which, by means of an operating device provided with a driving guide/guide path, swivels the tool about a swiveling axis during its transport from the ready position in the tool magazine and an orientation parallel to the spindle direction. The transport device is designed for an entire transport path between the magazine ready position and a spindle hand-over position. The transport device is aligned with the rotation axis of the stored tool. The swiveling axis runs perpendicularly to the transport direction and the spindle axis.

10 Claims, 2 Drawing Sheets

TOOL CHANGING DEVICE FOR A TOOL MACHINE

CROSS-REFERENCE TO RELATED APPLICATIONS

This is a continuation of international application PCT/EP01/02547, filed Mar. 7, 2001, which designated the United States and is now abandoned.

TECHNICAL FIELD

The invention relates to machine tools and more particularly, to a device for housing and changing tools onto a machine tool spindle.

BACKGROUND INFORMATION

A tool changing device of the type defined, for example, in DE 43 31 064 A1, consists of a transport device which can be moved along two horizontal linear guides and along a third vertical linear guide between a magazine (storage area) hand-over position and a spindle hand-over position. The transport device holds a tool housing with two gripping devices which can swivel on an axis perpendicular to the vertical driving direction and the spindle axis, between the spindle hand-over position, with horizontal alignment of the tool, and the vertical magazine hand-over position. The swivelling movement derives from the movement of the transport device on a sliding guide.

For the transport of the tool, therefore, three driving axis and at least one rotating axis are needed. A tool changing device of this kind is costly and expensive. Moreover, it requires a lot of space.

Another known tool changing device is disclosed in DE 40 09 537 C2 and includes a transport device which can be moved along one single linear guide between one hand-over position close to a magazine and a spindle hand-over position. The transport device holds a tool housing with two gripping devices that can swivel on an axis parallel to the driving direction, between the spindle hand-over position, with horizontal alignment of the tool, and the vertical magazine hand-over position. The swivelling movement derives on a control guide from the movement of the transport device, which occurs between the magazine hand-over position and the spindle hand-over position, by means of a toothed rack gear unit.

In the known device, the tools must be exchanged between the magazine and the tool housing staying in the stored hand-over position by means of a special handling robot. The toothed rack gear unit and the additional handling robot make the device significantly more expensive.

SUMMARY OF THE INVENTION

Accordingly, the present invention features a tool changing device which is simpler, cheaper and less susceptible to faults than the known types. The tool changing device of the present invention has only one single driving device for transporting the tool. The transport direction can be chosen in such a way that with the transport movement a tool can be placed directly into a tool casing in the magazine. In one transporting motion, the tool is brought to the spindle hand-over position. To swivel the tool in the spindle direction no rotation gear is needed.

In a preferred embodiment, the tool changing time can be significantly reduced by arranging two transport devices next to each other, one of which places the used operating tool held in the tool spindle in a spindle hand-over position and stores it into an empty storage place in the tool magazine, while the other transport device keeps a new operating tool, taken from the tool magazine, ready for coupling to the tool spindle in the spindle hand-over position.

The present invention features a machine tool changing device for a tool machine having at least one tool spindle and with which a machine tool can be coupled in a spindle hand-over position aligned along a machine tool hand-over spindle axis. The machine tool changing device includes a tool magazine in which is located at least one machine tool to be changed and engaged with the tool machine spindle. The at least one machine tool includes a rotation axis and is housed with an orientation wherein the rotation axis is diverging from the machine tool hand-over spindle axis.

The present invention also includes a transport device moving only in a transport direction which is parallel to the rotation axis of a stored machine tool for an entire transport cycle and including a machine tool holder which swivels the machine tool during its transport between a stored position and the spindle hand-over position along a guide path about a swiveling axis. The transport device moves along a transport guide between the stored position and the spindle hand-over position. The swiveling axis is perpendicular to the transport direction and the spindle axis.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
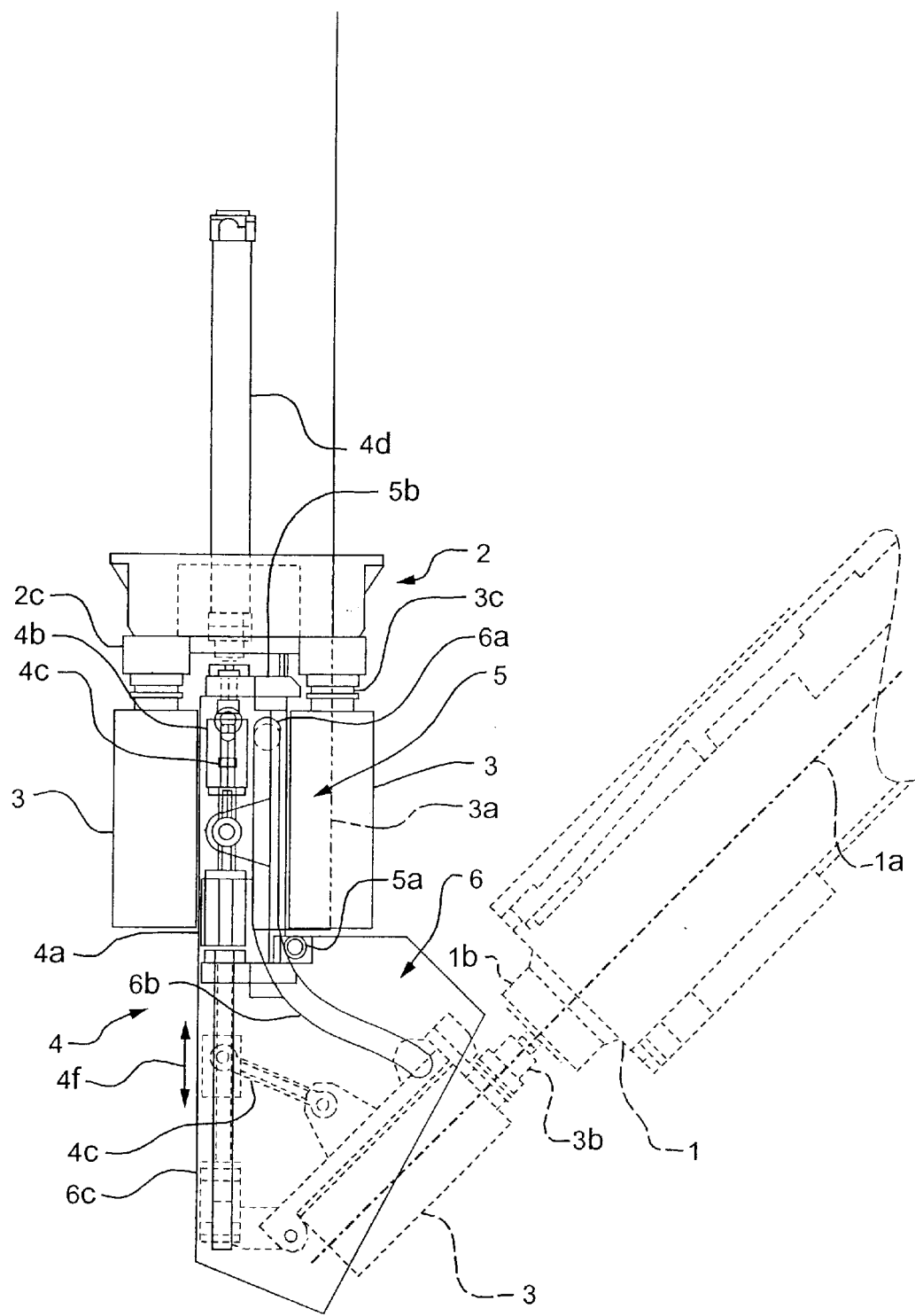
FIG. 1 is a schematic side view of a tool changing device.
Figure 2:
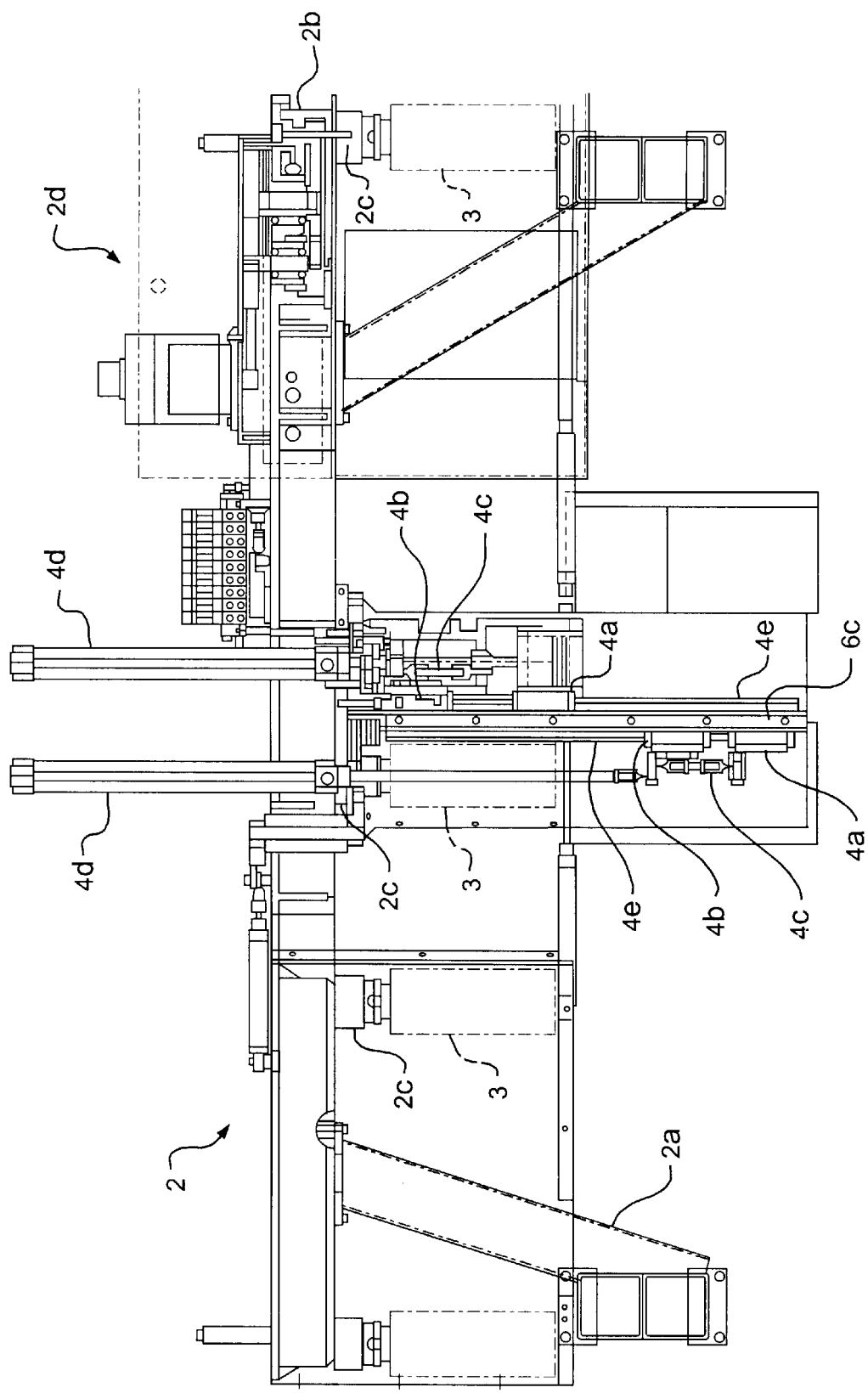
FIG. 2 is a front view of the tool store-room with the tool changing device according to FIG. 1.

A tool magazine 2 houses a series of tool holders 2c in a circularly driven magazine chain 2b, FIG. 2, and in which the tools 3 are stored together with their conical stem 3b. In a magazine ready or stored position, a tool changing device is provided with one of the two mirror-like structured transport devices 4. Each transport device includes two movable sleds 4a and 4b which can move in a vertical direction along shaft or path 4e in the direction of arrow 4f.

The first sled 4a is fitted with a swivel capable tool housing 5 on a swiveling axis 5a. A feed drive structured like a piston-cylinder unit 4d or the like is attached to the second sled 4b. An adjusting lever 4c is connected to the second sled 4b which is articulately joined with the tool holder 5 at a distance from the swiveling axis 5a.

In the magazine ready or stored position, a supporting unit 6c of the actuating device 6 for the tool holder 5 is firmly engaged to the magazine 2. The actuating device 6 swivels the tool holder 5 during the displacement of the transport device 4 between the ready position and a spindle hand-over position by means of a sliding block 6a fastened to it, which is driven along a guard or guide path 6b predisposed in the supporting unit 6c.

In the spindle hand-over position, a tool spindle 1 of a tool machine, which is not described below but well known to one of ordinary skill in the art and can be any type of spindle tool machine, having a tool backing cone 1b is brought in line with the conical stem 3b of a stand-by machine tool 3.

At the same time, the spindle axis 1a is aligned with the rotation axis 3a of the tool 3.

The tool holder 5 is provided with a driving plate 5b which can swivel crosswise to a transport direction 4f of the transport device 4 marked by double arrows between two positions. In a first position, the driving plate 5b grips a tool 3 below its conical stem 3b at a circular wedge-shaped ring groove 3c and holds the tool 3 firmly to the tool holder 5. In the second position, the driving plate 5b releases the tool 3 so that, by means of the magazine chain 2b, it can be transported from the ready position to the spindle hand-over position of tool spindle 1 in the processing area.

FIG. 2 shows an overall view of the tool magazine 2 with the tool changing device without the machine tool. Along a magazine stand 2a a magazine chain 2b is circularly driven by a chain drive 2d. The magazine chain 3 includes several tool holders 2c carrying the tools 3. In the magazine ready position, the magazine chain 2b includes an empty tool holder 2c and a tool holder 2c carrying the next tool 3 to be changed.

Each one of these two tool holders 2c is fitted with one of the above described transport devices 4. Between the two tool holders 2c, in the ready position, a supporting unit 6c is provided, which at any one time allows movement in direction 4f on both sides.

The two sleds 4a and 4b of the transport device 4 are arranged mirroring each other and can be moved at any time in either direction along path 4e between the ready position and the spindle hand-over position.

A tool change is carried out according to the following cycle:

The magazine chain 2b is driven by the chain drive 2d until the next tool 3 to be processed reaches the ready position. The selected tool 3 is inserted with its groove 3c into the driving plate 5b of the tool holder 5 in this position. At the beginning of the next transport movement of tool 3 towards the spindle hand-over position, the conical stem 3b of the tool is pulled out of the tool holder 2c. During the next movement, the tool holder 5 swivels in and toward a direction parallel to the spindle axis, and moves the tool 3 finally reaching the spindle hand-over position. Next to this tool holder now fitted with a new tool 3 the empty tool housing of the second transport device 4 is found in the same inclination of the spindle hand-over position.

The tool spindle 1 is moved in the tool hand-over position in the direction of its spindle axis 1a with the tool 3 to be changed. Here, the driving plate 5b of the empty tool holder 5 grips the tool 3 tensioned by the tool spindle 1. A short back swing of the tool spindle 1 removes the conical stem 3b from the tool tensioning cone 1b. The transport device 4 transports the used tool 3 to the empty tool holder 2c in magazine 2. At the same time, the tool spindle 1 is moved parallel to itself to a second tool holder 5 from which it takes on the new tool 3 by moving down in the spindle axis direction. After this step, the driving plate 5b is pulled back from the tool 3. The transport device 4 returns empty to its initial position where the operating device 6 moves the tool holder 5 back to the angular position to take on the next tool 3. The tool changing cycle is now concluded and the tool spindle 1 is ready to start a new cycle.

The tool changing process can also be carried out with one single transport device 4. In this case, the transport movements with the used tool 3 and the new tool must always be carried out one after the other. Also the use of a single transport device 4 with a double gripping device is possible if in the tool magazine 2 an empty tool holder 2c is always ready with the next tool 3 needed.

Modifications and substitutions by one of ordinary skill in the art are considered to be within the scope of the present invention, which is not to be limited except by the following claims.

The invention claimed is:

1. A machine tool changing device for a tool machine having one tool spindle movable at least in one direction and with which a machine tool can be coupled in a spindle hand-over position aligned along a machine tool hand-over spindle axis, the machine tool changing device comprising:
   a tool magazine in which is located at least one machine tool to be changed and engaged with said tool spindle, said at least one machine tool including a rotation axis and housed with an orientation wherein said rotation axis is diverging from said machine tool hand-over spindle axis; and
   a transport device moving only in a transport direction which is parallel to said rotation axis of a stored machine tool for an entire transport cycle and including a machine tool holder which swivels the machine tool during its transport between a stored position and the spindle hand-over position along a guide path about a swiveling axis, said transport device moving along a transport guide between the stored position and the spindle hand-over position, said swiveling axis perpendicular to said transport direction and the spindle axis.

2. The machine tool changing device according to claim 1, wherein said transport device further includes a sliding block coupled to a movable tool holder, said sliding block traveling along said guide path.

3. The machine tool changing device according to claim 1, wherein said guide path is disposed in said tool magazine.

4. The machine tool changing device according to claim 1, wherein the transport device includes at least one sled which moves in said transport direction and is fixed to said machine tool holder in a swiveling manner.

5. The machine tool changing device according to claim 1, wherein the transport device includes two sleds which can move in said transport direction, the first sled coupled to said tool holder and said second sled articulately connected to said tool holder by an adjusting lever.

6. The machine tool changing device according to claim 5, further including a driving device for moving said transport device in said transport direction, and wherein said driving device is coupled to said second sled.

7. The machine tool changing device according to claim 1, wherein said machine tools include a conical stem which is used to place the tools in the spindle of a tool machine and with which they are fixed to said tool magazine, and a conical ring groove with which the machine tools are placed in said tool holder.

8. The machine tool changing device according to claim 7, wherein the tool holder includes a driving plate which couples to the conical ring groove which swivels transversally to the transport direction.

9. The machine tool changing device according to claim 1, wherein the machine tools are stored in a circular manner inside the tool magazine.

10. The machine tool changing device according to claim 1, further including two independently driven transport devices arranged next to each other in the tool magazine.

* * * * *